United States Patent
Kovacs

(10) Patent No.: US 7,440,464 B2
(45) Date of Patent: Oct. 21, 2008

(54) SERVER CONTROL PLANE CONNECTIONS RECOVERY IN A SERVER-GATEWAY ARCHITECTURE BASED TELECOMMUNICATION NETWORK

(75) Inventor: Andras Kovacs, Budapest (HU)

(73) Assignee: Nokia Corporation, Espoo (FI)

( * ) Notice: Subject to any disclaimer, the term of this patent is extended or adjusted under 35 U.S.C. 154(b) by 1002 days.

(21) Appl. No.: 10/230,310

(22) Filed: Aug. 29, 2002

(65) Prior Publication Data
US 2004/0042468 A1   Mar. 4, 2004

(51) Int. Cl.
H04L 12/28   (2006.01)
H04L 12/56   (2006.01)

(52) U.S. Cl. ..................................... 370/401

(58) Field of Classification Search ......... 370/389–401, 370/216, 410, 535, 338, 352, 349, 466, 469, 370/437, 428, 412, 345, 500, 236, 328, 331, 370/424, 230; 709/231, 228, 249, 223, 229, 709/200, 238, 224; 455/410, 445, 456.1, 455/428, 432.1, 450, 464, 515, 522, 436, 455/423, 453, 438, 561, 439, 425, 442, 325; 705/7, 26; 714/174, 178, 43, 48; 726/15; 713/151–153, 168
See application file for complete search history.

(56) References Cited

U.S. PATENT DOCUMENTS

| | | | |
|---|---|---|---|
| 6,744,768 B2 * | 6/2004 | Vikberg et al. ......... 370/395.21 |
| 6,801,940 B1 | 10/2004 | Moran et al. ................ 709/224 |
| 7,299,277 B1 | 11/2007 | Moran et al. ................ 709/224 |
| 2001/0054158 A1 * | 12/2001 | Jarosz ........................ 713/201 |
| 2002/0152318 A1 * | 10/2002 | Menon et al. ............... 709/231 |
| 2003/0012154 A1 * | 1/2003 | Musikka .................... 370/328 |
| 2003/0161296 A1 * | 8/2003 | Butler et al. ................ 370/352 |
| 2004/0064552 A1 | 4/2004 | Chong et al. ................ 709/224 |
| 2004/0100914 A1 * | 5/2004 | Hellwig et al. .............. 370/254 |
| 2005/0002412 A1 * | 1/2005 | Sagfors et al. .............. 370/437 |
| 2005/0192004 A1 * | 9/2005 | Witzel et al. ................ 455/428 |
| 2006/0002301 A1 * | 1/2006 | Liu et al. .................... 370/236 |

OTHER PUBLICATIONS

3$^{rd}$ Generation Partnership Projectl Technical Specification Group Core Network; Bearer Independent CS Core Network; Stage 2, Release 4, Mar. 2001, V2.0. . 3GPP TS 23.205, pp. 10-178.*
Knights et al, Bearer-independent call control, Apr. 2001, BT Technical Journal, vol. 19, No. 2., pp. 77-88.*

* cited by examiner

Primary Examiner—Wing F. Chan
Assistant Examiner—Prenell P Jones
(74) Attorney, Agent, or Firm—Squire, Sanders & Dempsey, L.L.P.

(57) ABSTRACT

The present invention concerns a server control plane connections recovery method and a system for a server-gateway architecture based telecommunication network. Predetermined control data is buffered per traffic flow in the server and the buffered control data of a traffic flow is transmitted to the gateway associated with said traffic flow if there is change in said data. The transmitted control data is stored in said gateway. The server is restarted if it malfunctions and an indication about the server restart is transmitted to one or more gateways. The stored control data is transmitted back to the server from one or more gateways in response to a received server restart indication. The server control plane connections are restored to state before restart by utilizing the control data received from the gateways.

26 Claims, 2 Drawing Sheets

SERVER CONTROL PLANE CONNECTIONS RECOVERY IN A SERVER-GATEWAY ARCHITECTURE BASED TELECOMMUNICATION NETWORK

FIELD OF THE INVENTION

The present invention relates to telecommunications. In particular, the present invention relates to a novel and improved method and system for server control plane connections recovery in a server-gateway architecture based telecommunication network.

BACKGROUND OF THE INVENTION

Recently standards and specifications for global telecommunication networks have begun to emerge. One of these is $3^{rd}$ Generation Partnership Project (3GPP), which in the near future will likely replace such digital mobile networks used today as GSM, PDC and IS-95. A 3GPP network comprises a core network for switching, routing and management related functions. The 3GPP network further comprises radio access networks (RAN) for radio related functions. The 3GPP network further comprises user equipment, e.g. mobile stations. The core network further comprises a circuit switched domain for processing circuit switched traffic and a packet switched domain for processing packet switched traffic. For radio access networks, there are several possible ways of implementation. A GERAN (GSM EDGE Radio Access Network) utilizes EDGE (Enhanced Data Rates for GSM Evolution) as radio interface. An UTRAN (Universal Terrestrial Radio Access Network) utilizes WCDMA (Wideband Code Division Multiple Access) as radio interface. An IP-PAN is a radio access network utilizing Internet Protocol (IP) as a transport mechanism. An IP-RAN redefines the system architecture of a radio access network, when compared to an UTRAN or GERAN. E.g. most of the functions of a centralized controller (e.g. Radio Network Controller RNC or Base Station Controller BSC) are moved to base stations. In particular, radio protocol related functions are moved to base stations. However, an IP-RAN still conforms to an Iu interface of an UTRAN as well as to air interfaces of WCDMA, GSM and/or GERAN.

In the following a traffic flow refers to data corresponding to one or more simultaneous data connections. For example, data corresponding to an email message comprises a data connection. Data corresponding to a World Wide Web (WWW) browsing session comprises another data connection. When transmitted simultaneously to or from a given mobile station, these two data connections comprise a traffic flow. A data connection comprises two components, a user plane connection and a control plane connection. The control plane connection refers to elements necessary for controlling a data connection, such as signaling, whereas the user plane connection refers to the actual payload.

Traditionally telecommunication networks have been based on network elements which each process both the user plane and control plane connections of a data connection. Lately, however, network architectures have begun to emerge in which control and user plane connections are processed separately, e.g. by physically separate network elements. In the following such networks are referred to as being based on server-gateway architecture, in which context a server refers to a network element for processing control plane connections of traffic flows and a gateway refers to a network element for processing user plane connections of the same traffic flows. An example of such a server is a RAN Access Server (RNAS) used in IP-RAN for processing control plane connections between the IP-RAN and core network. An example of such a gateway is a RAN Gateway (RNGW) used in IP-RAN for processing user plane connections between the IP-RAN and core network. Another example of such a gateway is a Circuit Switched Gateway (CSGW) used in IP-RAN for processing user plane connections between the IP-RAN and A interface as well as between the IP-RAN and ATM-based Iu-CS-interface.

At the moment, however, there remains a significant problem with server-gateway architecture based telecommunication networks in that servers are not provided a recovery mechanism. Thus in case of a malfunctioning server, network users may experience service interruptions. Using mobility procedures implemented in prior art server-gateway interfaces it may be possible to change a malfunctioning gateway to a different available gateway. For servers, however, there are no such procedures. Hardware redundancy within a server is the only option to provide for high availability server operation at the moment. Unfortunately hardware redundancy leads to complexities in implementation and maintenance, thus resulting in unnecessarily high costs.

Thus there is an obvious need for a solution providing a server control plane connections recovery mechanism in a server-gateway architecture based telecommunication network.

SUMMARY OF THE INVENTION

The present invention concerns a server control plane connections recovery method and a system for a server-gateway architecture based telecommunication network comprising a server for processing control plane connections of traffic flows, and one or more gateways for processing user plane connections of said traffic flows.

Predetermined control data is buffered per traffic flow in the server, and the server is restarted if it malfunctions.

According to the invention, the buffered control data of a traffic flow is transmitted to the gateway associated with said traffic flow if there is change in said data. The transmitted control data is stored in said gateway. An indication about the server restart is transmitted to one or more gateways. The stored control data is transmitted back to the server from one or more gateways in response to a received server restart indication. Finally, the control plane connections of the server are restored to a state before the restarting of the server by utilizing the control data received from the gateways.

In an embodiment of the invention using transparent containers for transmitting the control data to and from the gateways. A transparent container refers to a container storing data in a server specific format, thus resulting in gateways not investigating the contents of the container, the container thus being transparent to the gateways.

In an embodiment of the invention the control data comprises mapping of traffic flows across various server interfaces. The control data may further comprise user identities. The control data may further comprise Radio Access Bearer data stored per traffic flow.

In an embodiment of the invention the telecommunication network is a 3GPP network ($3^{rd}$ Generation Partnership Project).

In an embodiment of the invention control data between a server and a gateway is transmitted in either or both directions utilizing a Megaco architecture-based protocol. Megaco refers to a prior art protocol architecture for a control protocol between a media gateway controller and a media gateway. Megaco is developed by ITU-T (The Telecommunications Standardization Sector of the International Telecommunications Union) and IETF (Internet Engineering Task Force). Megaco is also known as H.248.

In an embodiment of the invention the protocol for transmitting control data is GWCAP. GWCAP (Gateway Control Application Part) refers to a prior art protocol used e.g. for configuring gateways in IP-RAN.

In an embodiment of the invention the server is an RNAS (RAN Access Server) of an IP-RAN.

In an embodiment of the invention the gateway is a circuit switched gateway, e.g. a CSGW (Circuit Switched Gateway) of an IP-RAN. In another embodiment of the invention the gateway is a packet switched gateway, e.g. an RNGW (RAN Gateway) of an IP-RAN.

The invention provides a server control plane connections recovery mechanism in a server-gateway architecture based telecommunication network thus eliminating need for hardware redundancy. Additionally, the invention significantly decreases the possibility of network users experiencing network outage, since in most cases of server malfunction the server can be recovered before users would begin to experience service interruptions.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Reference will now be made in detail to the embodiments of the present invention, examples of which are illustrated in the accompanying drawings.

Figure 1:
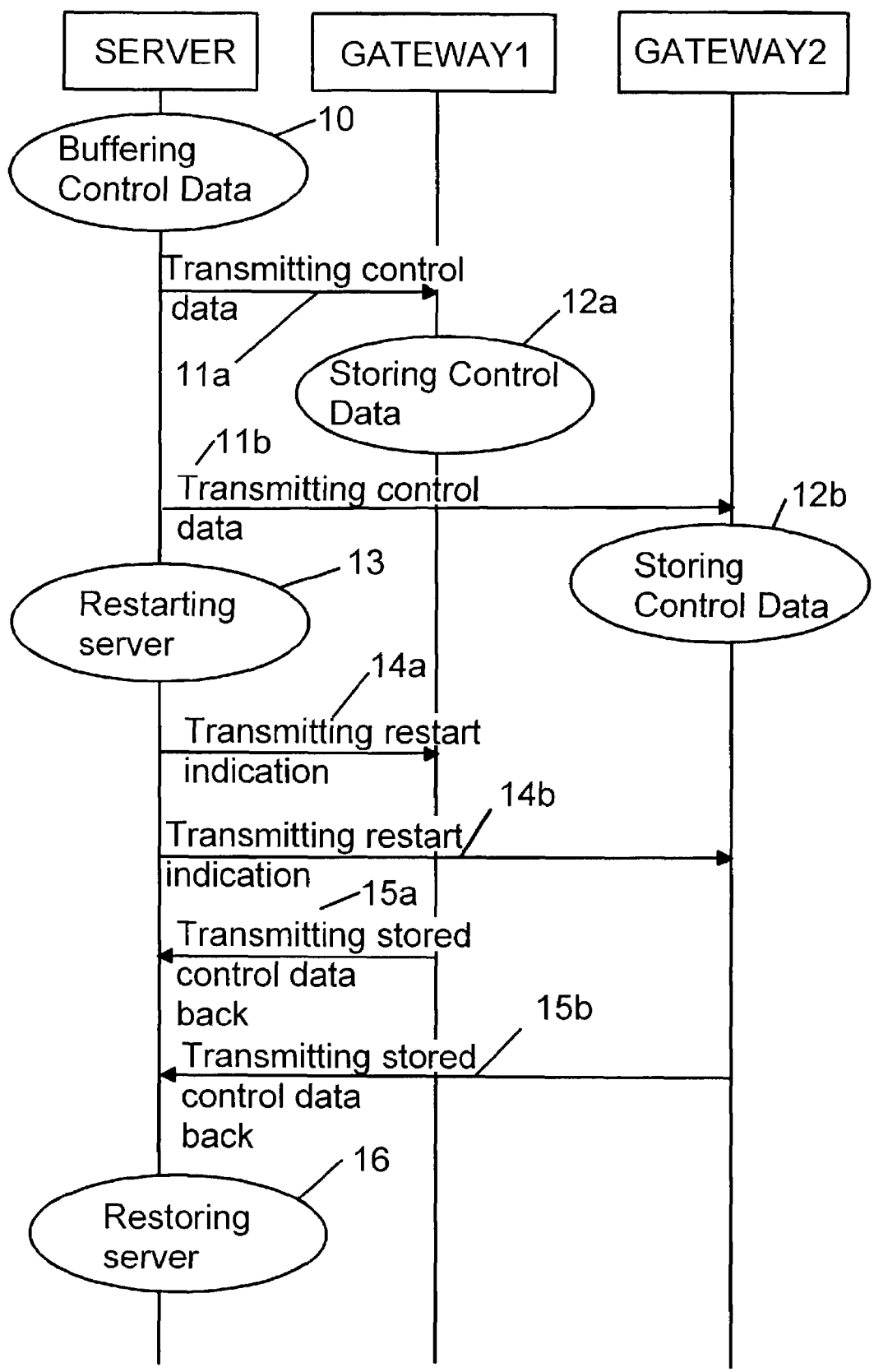
FIG. 1 is a flow chart illustrating a server control plane connections recovery method according to one embodiment of the present invention.

FIG. 1 illustrates a server control plane connections recovery method for a server-gateway architecture based telecommunication network according to one embodiment of the present invention. The server-gateway architecture based telecommunication network comprises a server SERVER for processing control plane connections of traffic flows, and gateways GATEWAY1, GATEWAY2 for processing user plane connections of said traffic flows.

Predetermined control data is buffered per traffic flow in the server, phase 10. The buffered control data of a traffic flow is transmitted to the gateway associated with said traffic flow if there is change in said data, preferably by using transparent containers, phases 11a and 11b. The transmitted control data is stored in the gateways, phases 12a and 12b. The server is restarted if it malfunctions, phase 13. An indication about the server restart is transmitted to gateways, phases 14a and 14b. The stored control data is transmitted back to the server from the gateways in response to the received server restart indications, preferably by using transparent containers, phases 15a and 15b. Finally the control plane connections of the server are restored to state before restart by utilizing the control data received from the gateways, phase 16.

Figure 2:
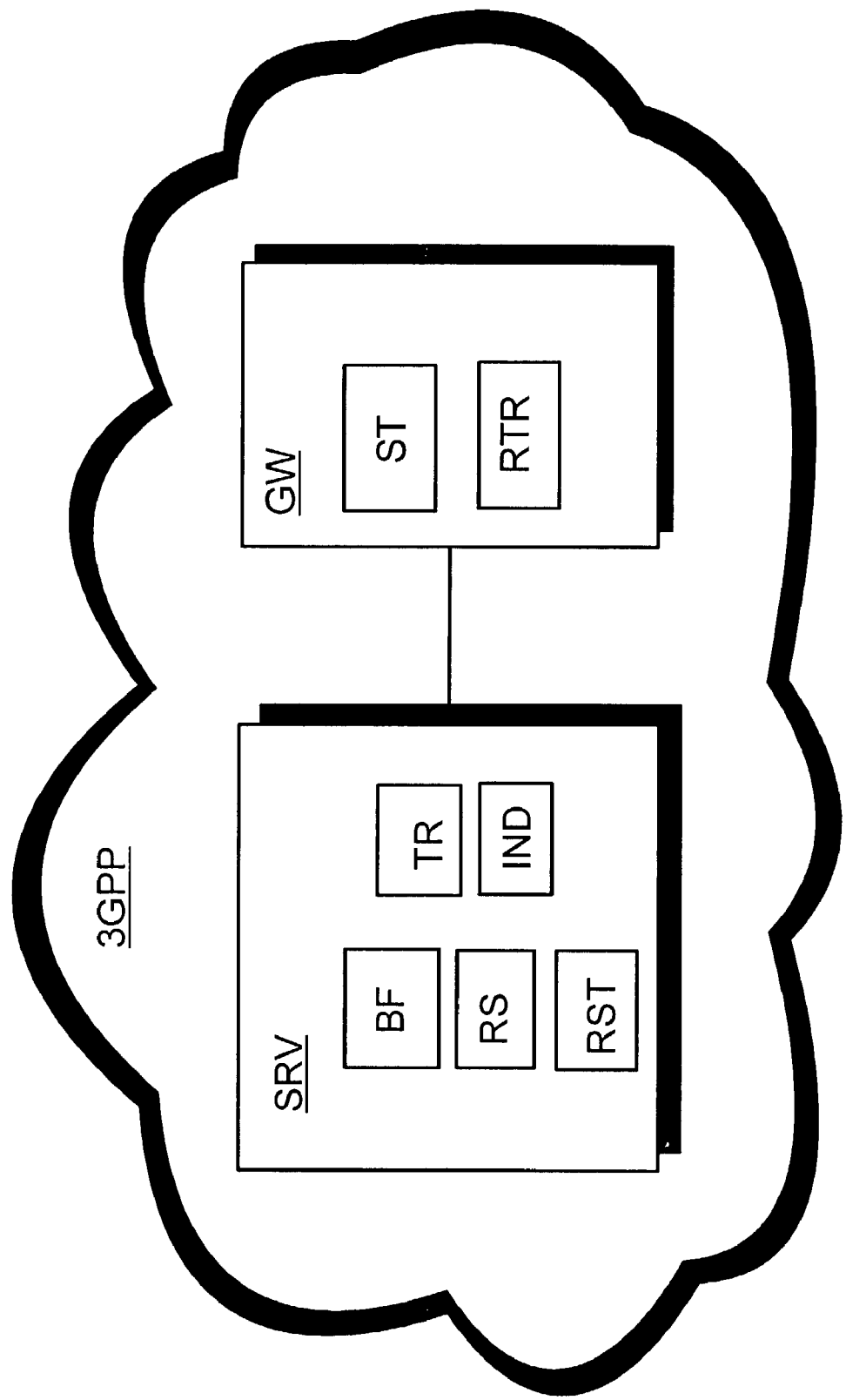
FIG. 2 is a block diagram illustrating a server control plane connections recovery system according to one embodiment of the present invention.

FIG. 2 illustrates a server control plane connections recovery system for a server-gateway architecture based telecommunication network according to one embodiment of the present invention. The server-gateway architecture based telecommunication network comprises a server SRV for processing control plane connections of traffic flows, and a gateway GW for processing user plane connections of said traffic flows. In the embodiment of the invention disclosed in FIG. 2 the telecommunication network is a 3GPP network, the server is an RNAS and the gateway is a CSGW.

In the embodiment of the invention disclosed in FIG. 2 the system comprises a buffer BF for buffering predetermined control data per traffic flow in the server SRV, and a restarter RS for restarting the server SRV if it malfunctions.

The system further comprises a transmitter TR for transmitting the buffered control data of a traffic flow to the gateway GW associated with said traffic flow if there is change in said data, preferably by using transparent containers. The system further comprises a storage ST for storing the transmitted control data in said gateway GW. The system further comprises an indicator IND for transmitting an indication about the server restart to the gateway GW. The system further comprises a re-transmitter RTR for transmitting the stored control data back to the server SRV from the gateway GW in response to a received server restart indication, preferably by using transparent containers. The system further comprises a restorer RST for restoring the control plane connections of the server SRV to a state before the restarting of the server by utilizing the control data received from the gateway GW. In the embodiment of the invention disclosed in FIG. 2 the transmitter and re-transmitter utilize GWCAP-protocol (not illustrated) for transmitting control data.

In the embodiment of the invention disclosed in FIG. 2 the buffer BF, restarter RS, transmitter TR, indicator IND and restorer RST are preferably implemented in connection with the server SRV. Correspondingly the storage ST and re-transmitter RTR are preferably implemented in connection with the gateway GW. The transmitter TR, indicator IND and re-transmitter RTR may further be implemented e.g. as mechanisms in an already existing interface between the server SRV and gateway GW (not illustrated). Suitable software/hardware based solutions may be used in implementation.

It is obvious to a person skilled in the art that with the advancement of technology, the basic idea of the invention may be implemented in various ways. The invention and its embodiments are thus not limited to the examples described above, instead they may vary within the scope of the claims.

The invention claimed is:

1. A method, comprising:

processing control plane connections of traffic flows using a server;

processing user plane connections of said traffic flows using one or more gateways, buffering predetermined control data per traffic flow in the server;

restarting the server when it malfunctions;

transmitting the buffered control data of a traffic flow to the gateway associated with said traffic flow when there is change in said data;

storing the transmitted control data in said gateway;

transmitting a server restart indication signal indicating the restarting of the server to one or more gateways;

transmitting the stored control data back to the server from one or more gateways in response to the server restart indication signal; and restoring the control plane connections of the server to a state before the restarting of the server by utilizing the control data received from the gateways.

2. The method according to claim 1, further comprising:
using transparent containers for transmitting the control data to and from the gateways.

3. The method according to claim 1, wherein the control data comprises mapping of traffic flows across various server interfaces, user identities, and/or radio access bearer data stored per traffic flow.

4. A system, comprising:
a server configured to process control plane connections of traffic flows;
one or more gateways configured to process user plane connections of said traffic flows;
a buffer configured to buffer predetermined control data per traffic flow in the server;
a restarter configured to restart the server when it malfunctions;
a transmitter configured to transmit the buffered control data of a traffic flow to the gateway associated with said traffic flow when there is change in said data;
a storage configured to store the transmitted control data in said gateway;
an indicator configured to transmit a server restart indication signal indicating the restarting of the server to one or more gateways;
a re-transmitter configured to transmit the stored control data back to the server from one or more gateways in response to the server restart indication signal; and
a restorer configured to restore the control plane connections of the server to a state before the restarting of the serve by utilizing the control data received from the gateways.

5. The system according to claim 4, wherein the transmitter and the re-transmitter use transparent containers for transmitting the control data.

6. The system according to claim 4, wherein the control data comprises mapping of traffic flows across various server interfaces, user identities, and/or Radio Access Bearer data stored per traffic flow.

7. The system according to claim 4, wherein the system is provided the telecommunication network is a third generation partnership project (3GPP) network.

8. The system according to claim 7, wherein the transmitter and/or re-transmitter utilize a Megaco architecture-based protocol for transmitting control data.

9. The system according to claim 8, wherein the protocol is groupwise calendar access protocol.

10. The system according to claim 7, wherein the server is a radio network access server.

11. The system according to claim 7, wherein the gateway is a circuit switched gateway.

12. The system according to claim 7, wherein the gateway is a packet switched gateway.

13. A system, comprising:
server means for processing control plane connections of traffic flows;
one or more gateway means for processing user plane connections of said traffic flows;
buffer means for buffering predetermined control data per traffic flow in the server;
restarter means for restarting the server when it malfunctions;
transmitter means for transmitting the buffered control data of a traffic flow to the gateway associated with said traffic flow when there is change in said data;
storage means for storing the transmitted control data in said gateway;
indicator means for transmitting a server restart indication signal indicating the restarting of the server to one or more gateways;
re-transmitter means for transmitting the stored control data back to the server from one or more gateways in response to the server restart indication signal; and
restorer means for restoring the control plane connections of the server to a state before the restarting of the server by utilizing the control data received from the gateways.

14. An apparatus, comprising:
a buffer configured to buffer predetermined control data per traffic flow;
a restarter configured to restart the apparatus when it malfunctions;
a transmitter configured to transmit the buffered control data of a traffic flow to a gateway associated with said traffic flow when there is change in said data;
an indicator configured to transmit a restart indication signal indicating the restarting of the apparatus to the gateway;
a restorer configured to restore control plane connections of the apparatus to a state before the restarting of the apparatus by utilizing the control data re-transmitted from the gateway in response to the restart indication signal.

15. The apparatus according to claim 14, wherein the transmitter uses transparent containers for transmitting the control data.

16. The apparatus according to claim 14, wherein the control data comprises mapping of traffic flows across various server interfaces, user identities, and/or radio access bearer data stored per traffic flow.

17. The apparatus according to claim 14, wherein the apparatus comprises a server in a third generation partnership project (3GPP) network.

18. The apparatus according to claim 17, wherein the transmitter utilizes a Megaco architecture-based protocol to transmit control data.

19. The apparatus according to claim 18, wherein the protocol is a groupwise calendar access protocol.

20. The apparatus according to claim 17, wherein the apparatus is a radio network access server.

21. The apparatus according to claim 17, wherein the gateway is a circuit switched gateway.

22. The apparatus according to claim 17, wherein the gateway is a packet switched gateway.

23. An apparatus, comprising:
buffering means for buffering predetermined control data per traffic flow;
restarting means for restarting the apparatus when it malfunctions;
transmitting means for transmitting the buffered control data of a traffic flow to a gateway associated with said traffic flow when there is change in said data;
indicating means for transmitting a restart indication signal indicating the restarting of the apparatus to the gateway;
restoring means for restoring control plane connections of the apparatus to a state before the restarting of the apparatus by utilizing the control data re-transmitted from the gateway in response to the restart indication signal.

24. A method, comprising:
buffering predetermined control data per traffic flow;
restarting an apparatus when it malfunctions;
transmitting the buffered control data of a traffic flow to a gateway associated with said traffic flow when there is change in said data;
transmitting a restart indication signal indicating the restarting of the apparatus to the gateway;
restoring control plane connections of the apparatus to a state before the restarting of the apparatus by utilizing the control data re-transmitted from the gateway in response to the restart indication signal.

25. The method according to claim 24, further comprising:
using transparent containers to transmit the control data to and from the gateway.

26. The method according to claim 24, wherein the control data comprises mapping of traffic flows across various server interfaces, user identities, and/or radio access bearer data stored per traffic flow.

* * * * *